United States Patent
Yang et al.

(10) Patent No.: US 8,400,588 B2
(45) Date of Patent: Mar. 19, 2013

(54) LIQUID CRYSTAL DISPLAY

(75) Inventors: Byung-Duk Yang, Yongin-si (KR);
Eun-Guk Lee, Seoul (KR); Sang-Ki Kwak, Asan-si (KR); Dong-Yoon Kim, Seoul (KR); Yun-Jong Yeo, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 288 days.

(21) Appl. No.: 12/900,433

(22) Filed: Oct. 7, 2010

(65) Prior Publication Data
US 2011/0216276 A1  Sep. 8, 2011

(30) Foreign Application Priority Data
Mar. 5, 2010  (KR) .................. 10-2010-0019885

(51) Int. Cl.
*G02F 1/1335* (2006.01)
(52) U.S. Cl. .................................. 349/106
(58) Field of Classification Search .............. 349/106
See application file for complete search history.

(56) References Cited

U.S. PATENT DOCUMENTS
| | | | | |
|---|---|---|---|---|
| 5,623,353 A | * | 4/1997 | Kanemoto et al. | 349/122 |
| 6,671,025 B1 | * | 12/2003 | Ikeda et al. | 349/156 |
| 2009/0167973 A1 | * | 7/2009 | Chang et al. | 349/43 |

FOREIGN PATENT DOCUMENTS
| | | |
|---|---|---|
| JP | 2007-286384 | 11/2007 |
| JP | 2008-026812 | 2/2008 |
| KR | 10-2004-0061230 | 7/2004 |

* cited by examiner

*Primary Examiner* — James Dudek
(74) *Attorney, Agent, or Firm* — H.C. Park & Associates, PLC

(57) ABSTRACT

A liquid crystal display according to an exemplary embodiment of the present invention includes: a first substrate; a first signal line disposed on the first substrate, a thin film transistor connected with the first signal line, a first color filter and a second color filter disposed on the first substrate; a colored member disposed on the first color filter and the second color filter; and a pixel electrode disposed on the first color filter and the second color filter and the colored member, wherein the first color filter and the second color filter are partially overlapped with each other and the height of the colored member disposed at the overlap between the first color filter and the second color filter is greater than the height of the colored member disposed not at the overlap.

27 Claims, 9 Drawing Sheets

LIQUID CRYSTAL DISPLAY

CROSS REFERENCE TO RELATED APPLICATION

This application claims priority from and the benefit of Korean Patent Application No. 10-2010-0019885, filed on Mar. 5, 2010, which is hereby incorporated by reference for all purposes as if fully set forth herein.

BACKGROUND OF THE INVENTION

1. Field of the Invention

Exemplary embodiments of the present invention relate to a liquid crystal display.

2. Discussion of the Background

A liquid crystal display that includes two display panels with electrodes and a liquid crystal layer interposed therebetween is a type of flat panel display being widely used at present. The liquid crystal display rearranges liquid crystal molecules of the liquid crystal layer by applying voltage to the electrodes to control the intensity of transmitted light.

Among the types of liquid crystal displays, a liquid crystal display primarily used at present has a structure in which an electric field generation electrode is provided in each of the two display panels. Among these, a structure in which a plurality of thin film transistors and pixel electrodes are arranged in matrix on one display panel (hereinafter, referred to as 'thin film transistor display panel') and color filters of red, green, and blue are formed on the other display panel and a common electrode covers a full surface thereof (hereinafter, referred to as 'common electrode display panel') is the mainstream.

However, in the liquid crystal display, since the pixel electrode and the color filter are formed on different display panels, accurate alignment is difficult between the pixel electrode and the color filter, such that an alignment error may be generated.

In order to solve the problem, a color filter on array (CoA) structure in which the color filter and the pixel electrode are formed on the same display panel is proposed. At this time, a shield member is generally formed on the same display panel as the pixel electrode in addition to the color filter.

Meanwhile, a spacer may be formed in order to maintain a constant thickness of the liquid crystal layer of the liquid crystal display. The spacer may include a main spacer controlling the thickness of a liquid crystal cell of the liquid crystal display and a plurality of sub-spacers formed lower than the main spacer in order to prevent a smear defect, etc. The main spacer and the sub-spacer form various height differences to maintain a cell gap even under various external pressures.

However, an exposure amount or a cross section of the spacer is controlled using the same layer so that the main spacer and the sub-spacer are formed to have a desired step. Through this method, it may be difficult to acquire the desired step and a process for forming the spacer may become complicated.

The above information disclosed in this Background section is only for enhancement of understanding of the background of the invention and therefore it may contain information that does not form part of the prior art that was previously known to a person of ordinary skill in the art.

SUMMARY OF THE INVENTION

Exemplary embodiments of the present invention provide a liquid crystal display capable of preventing a smear defect while maintaining a constant cell gap of the liquid crystal display without an additional process for forming a sub-spacer.

Additional features of the invention will be set forth in the description which follows, and in part will be apparent from the description, or may be learned by practice of the invention.

An exemplary embodiment of the present invention discloses a liquid crystal display that includes: a first substrate; a first color filter and a second color filter disposed on the first substrate; a colored member disposed on the first color filter and the second color filter; and a pixel electrode disposed on the first color filter and the second color filter. The first color filter and the second color filter are partially overlapped with each other, and the thickness of the overlap between the first color filter and the second color filter is less than the thickness of an overlap between the color filters and the pixel electrode, and the height of the colored member disposed at the overlap between the first color filter and the second color filter is greater than the height of the colored member disposed at the rest of the parts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The present invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. As those skilled in the art will realize, the described embodiments may be modified in various different ways, all without departing from the spirit or scope of the present invention.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" or "connected to" another element, it can be directly on or directly connected to the other element or intervening elements may be present. In contrast, when an element is referred to as being "directly on" or "directly connected to" another element, there are no intervening elements present.

Hereinafter, a liquid crystal display according to an exemplary embodiment of the present invention will be described in brief with reference to FIG. 1.

Figure 1:
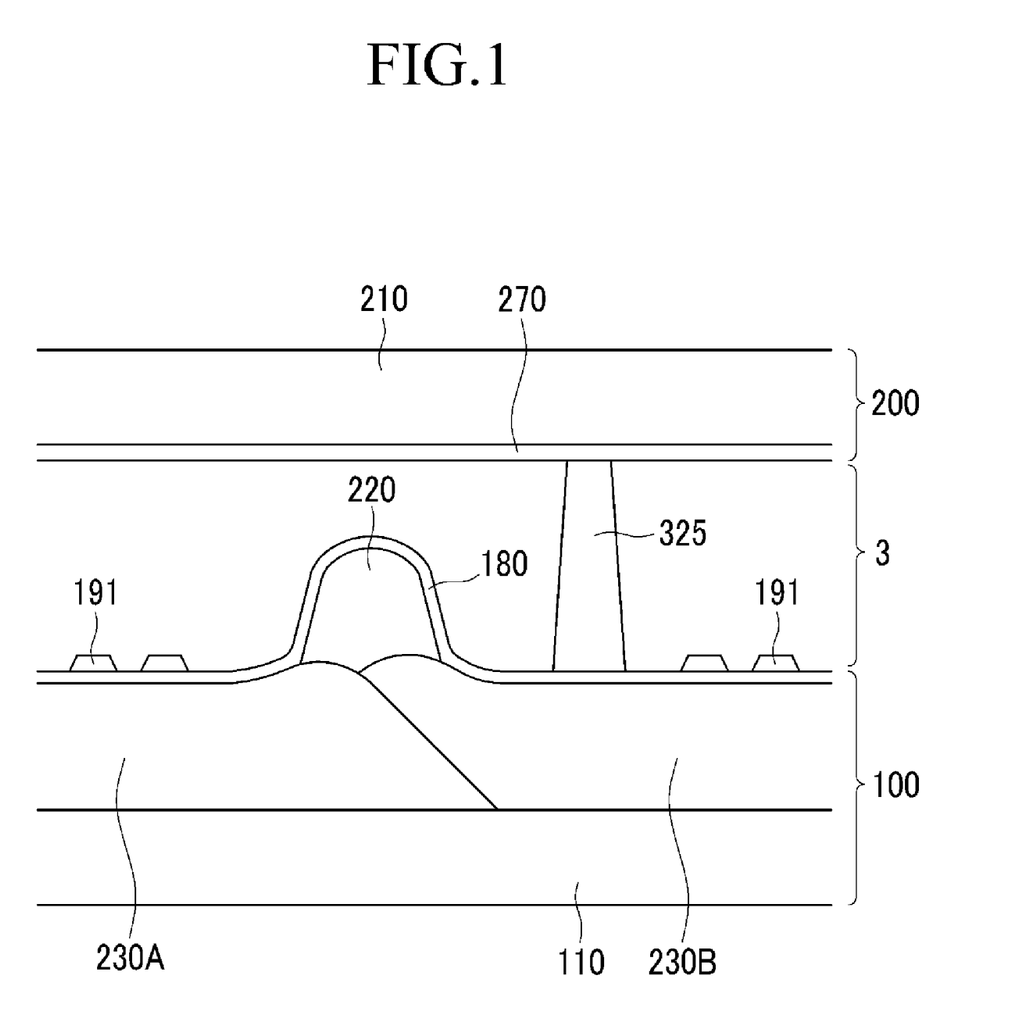
FIG. 1 is a cross-sectional view schematically showing the structure of a liquid crystal display according to an exemplary embodiment of the present invention.

FIG. 1 is a cross-sectional view schematically showing the structure of a liquid crystal display according to an exemplary embodiment of the present invention.

As shown in FIG. 1, the liquid crystal display according to the exemplary embodiment of the present invention includes a lower display panel 100 and an upper display panel 200 that face each other and a liquid crystal layer 3 interposed therebetween.

The lower display panel 100 includes a substrate 110, a first color filter 230A and a second color filter 230B that are formed on the substrate 110 and are overlapped on each other, a colored member 220 that is formed on the substrate 110 and disposed at an overlap of the first color filter and 230A and the second color filter 230B, an insulating layer 180 disposed on the first color filter 230A, the second color filter 230B and the colored member 220, and a pixel electrode 191 and a spacer 325 that are disposed on the insulating layer 180.

The thickness of a portion of the first color filter 230A that is overlapped with the pixel electrode 191 is greater than the thickness of a portion of the first color filter 230A that is overlapped with the second color filter 230B. Likewise, the thickness of a portion of the second color filter 230B that is overlapped with the pixel electrode 191 is greater than the thickness of a portion of the second color filter 230B that is overlapped with the first color filter 230A.

The upper display panel 200 includes a common electrode 270 formed on the substrate 210.

The height of the colored member 220 disposed on the overlap of the first color filter 230A and the second color filter 230B may be less than that of the spacer 325.

In another embodiment, the spacer 325 may be formed by the same layer as the colored member 220.

Figure 2:
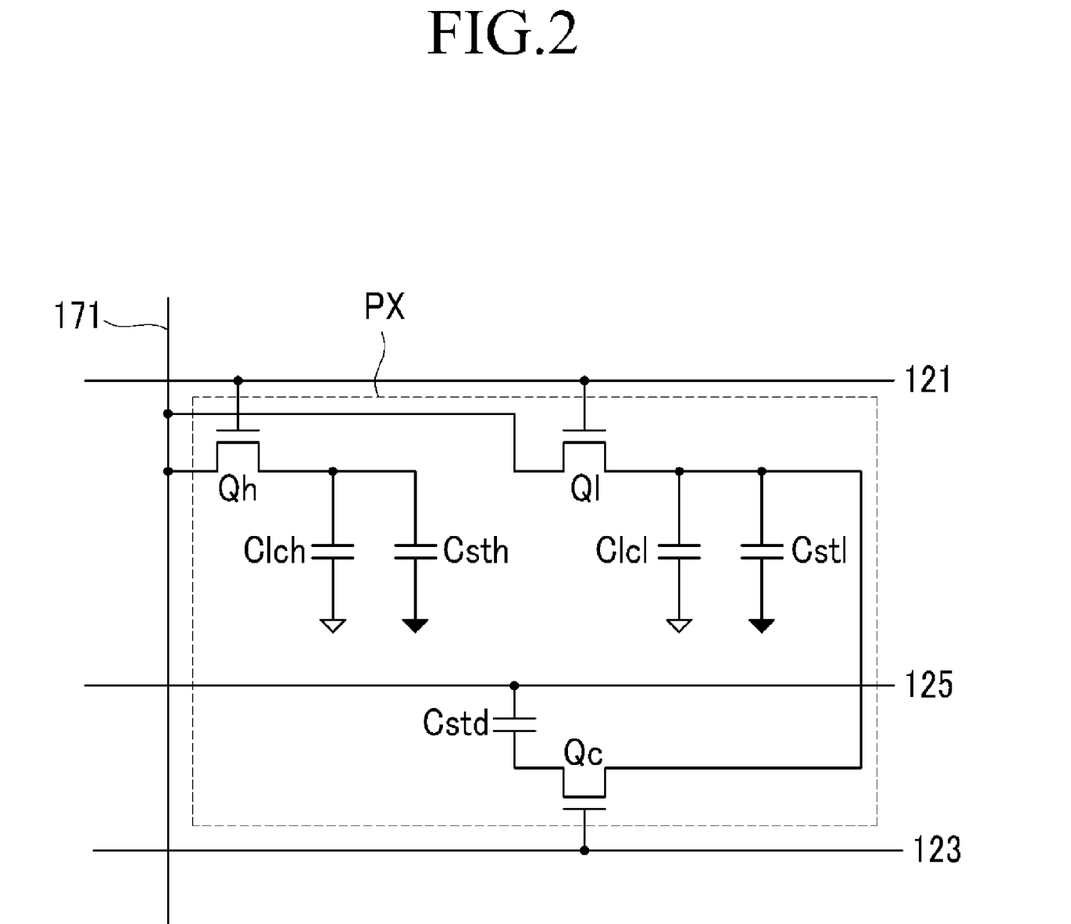
FIG. 2 is an equivalent circuit diagram of one pixel in a liquid crystal display according to an exemplary embodiment of the present invention.
Figure 3:
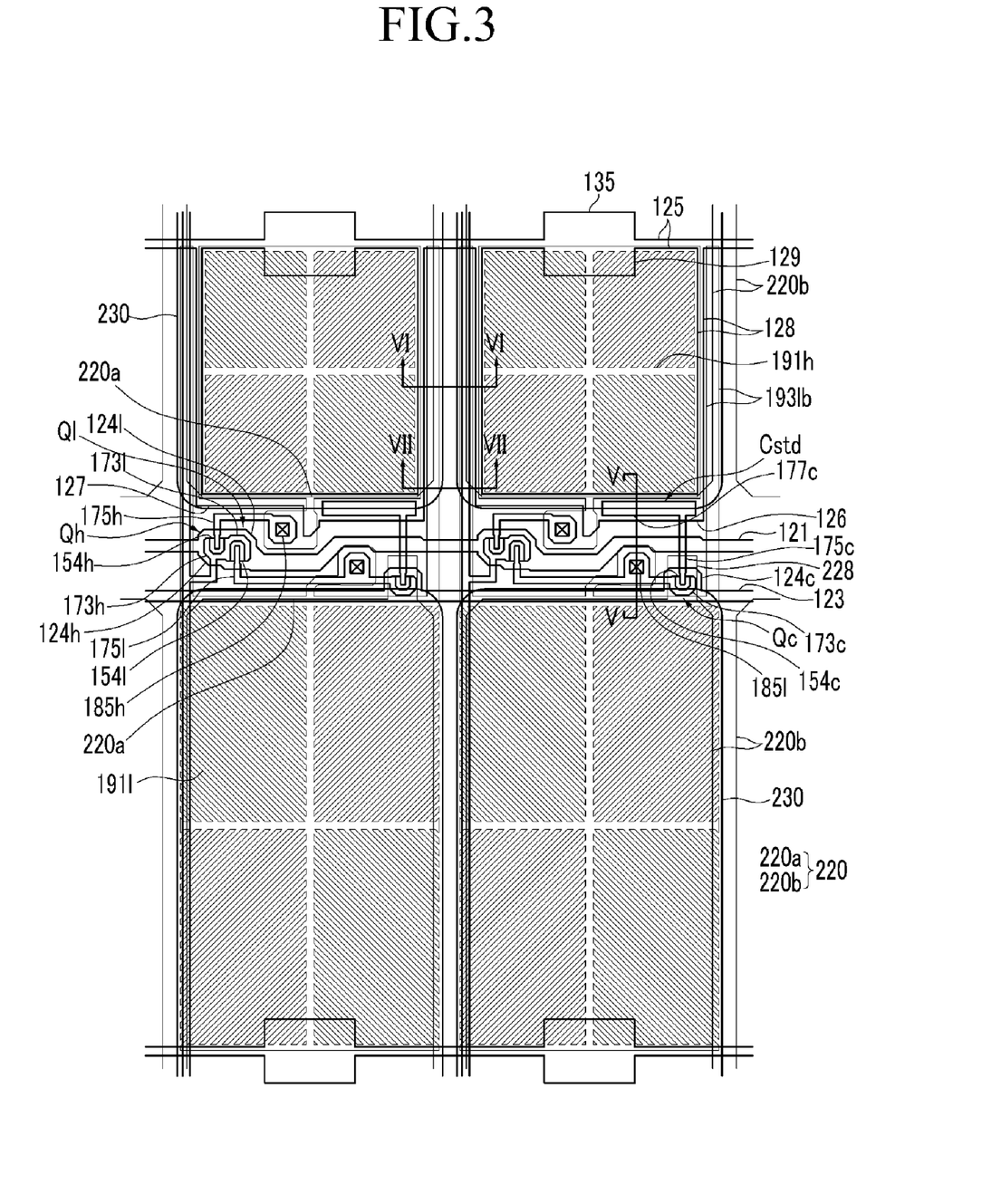
FIG. 3 is a layout view of a liquid crystal display according to an exemplary embodiment of the present invention.
Figure 4:
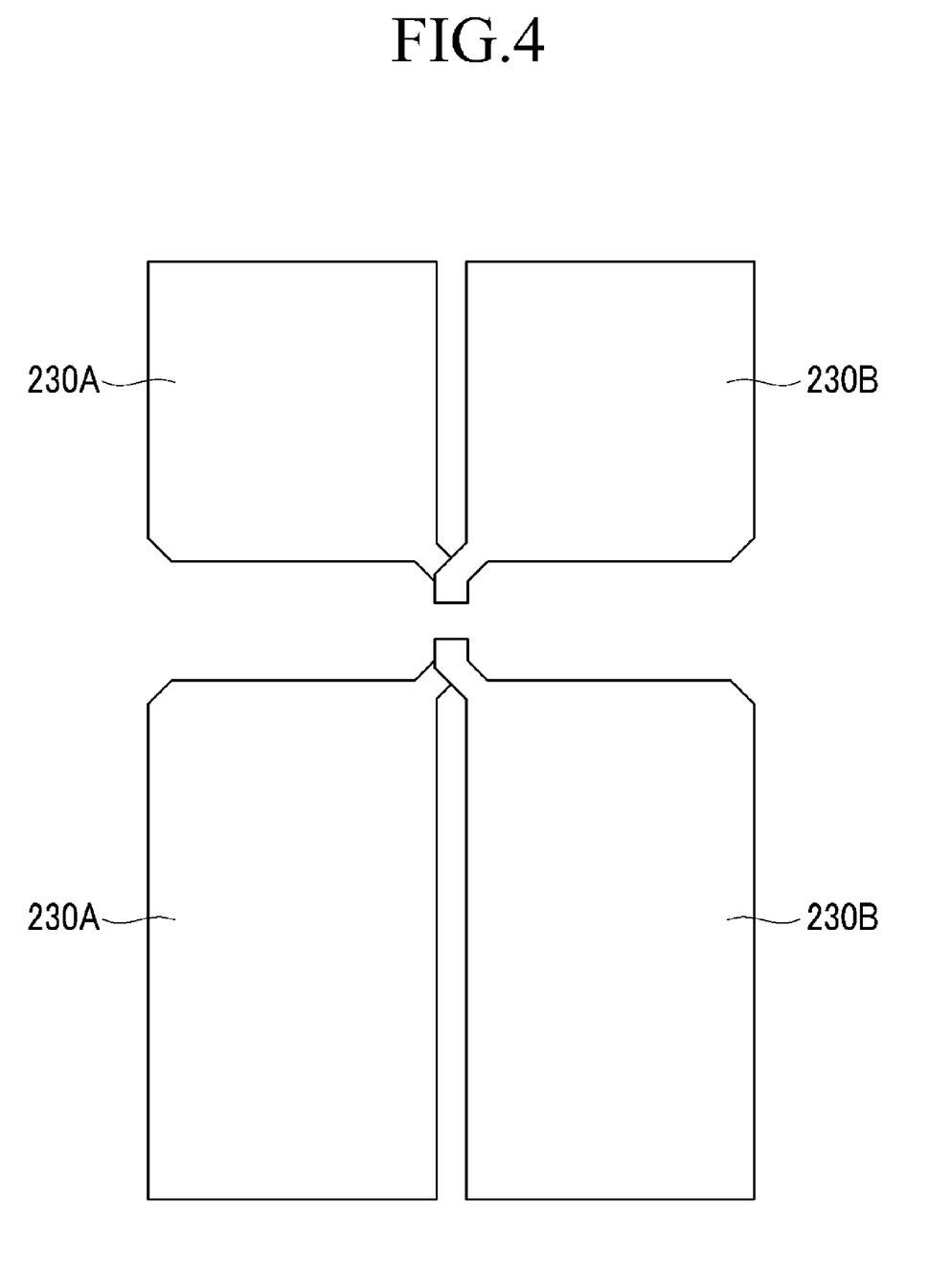
FIG. 4 is a layout view of a color filter of a liquid crystal display according to an exemplary embodiment of the present invention.
Figure 5:
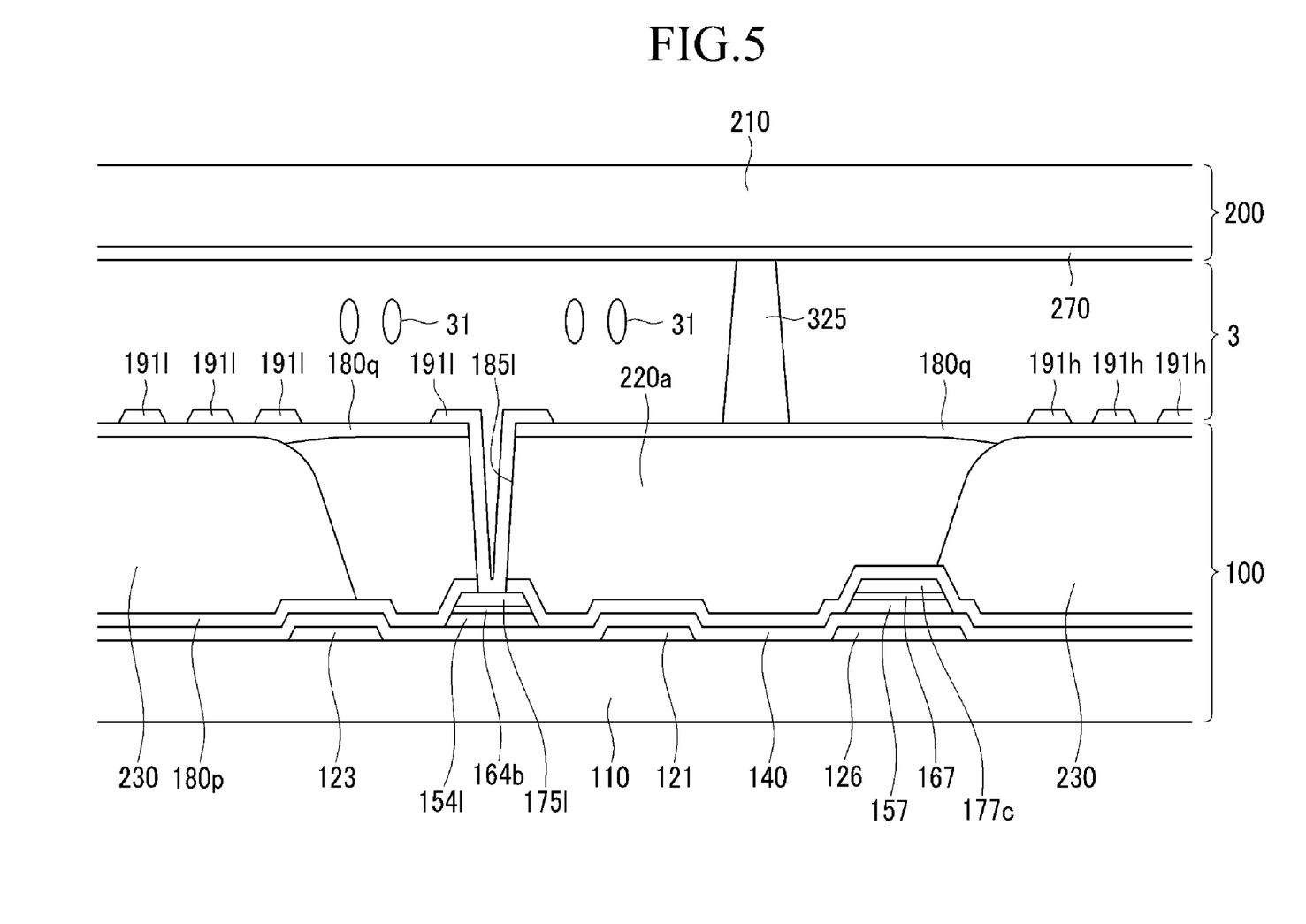
FIG. 5 is a cross-sectional view of a liquid crystal display taken along line V-V of FIG. 3.
Figure 6:
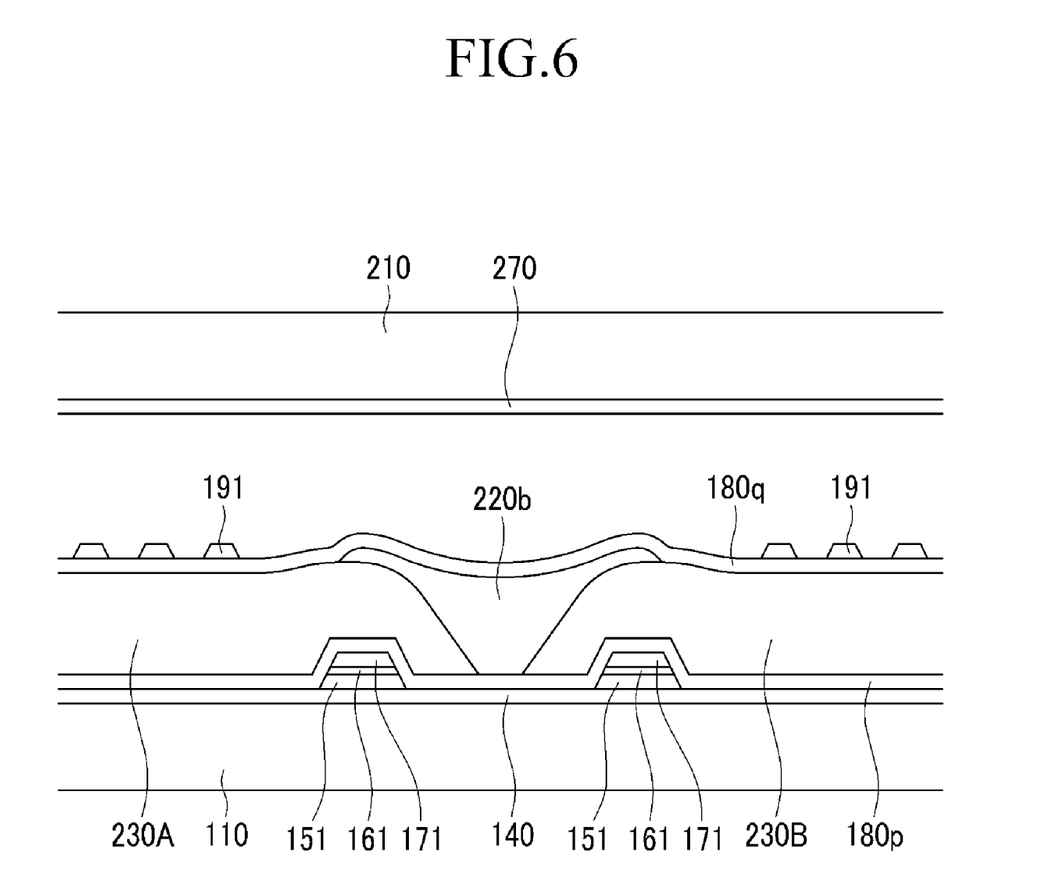
FIG. 6 is a cross-sectional view of a liquid crystal display taken along line VI-VI of FIG. 3.
Figure 7:
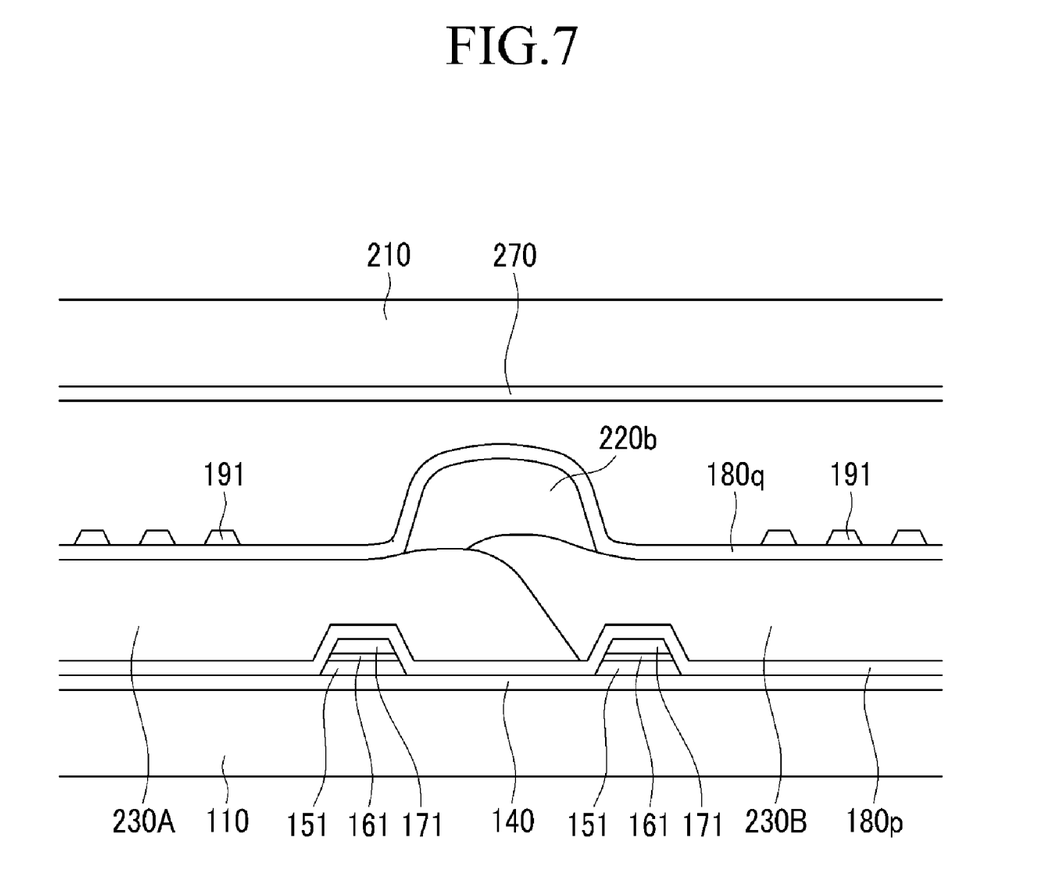
FIG. 7 is a cross-sectional view of a liquid crystal display taken along line VII-VII of FIG. 3.
Figure 8:
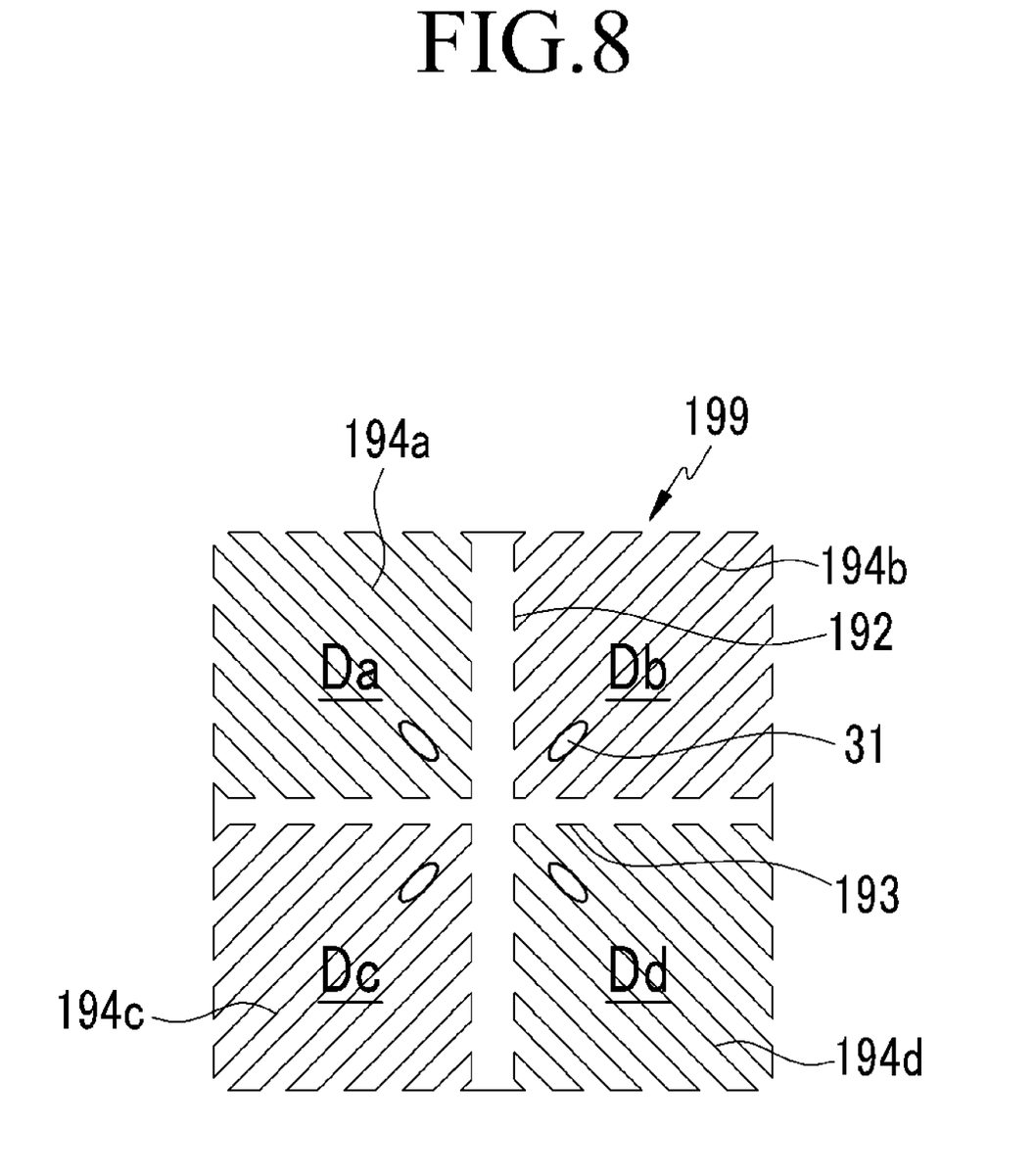
FIG. 8 is a layout view of a pixel electrode of a liquid crystal display of FIG. 3.

Hereinafter, referring to FIG. 2, FIG. 3, FIG. 4, FIG. 5, FIG. 6, FIG. 7, and FIG. 8, a liquid crystal display according to an exemplary embodiment of the present invention will be described in detail. FIG. 2 is an equivalent circuit diagram of one pixel in a liquid crystal display according to an exemplary embodiment of the present invention, FIG. 3 is a layout view of a liquid crystal display according to an exemplary embodiment of the present invention, FIG. 4 is a layout view of a color filter of a liquid crystal display according to an exemplary embodiment of the present invention, FIG. 5 is a cross-sectional view of a liquid crystal display taken along line V-V of FIG. 3, FIG. 6 is a cross-sectional view of a liquid crystal display taken along line VI-VI of FIG. 3, FIG. 7 is a cross-sectional view of a liquid crystal display taken along line VII-VII of FIG. 3, and FIG. 8 is a layout view of a pixel electrode of a liquid crystal display of FIG. 3.

Referring to FIG. 2, the liquid crystal display according to the exemplary embodiment of the present invention includes signal lines including a gate line 121, a sustaining electrode line 125, a voltage drop gate line 123, and a data line 171 and a pixel PX connected with the signal lines.

The pixel PX includes first, second, and third switching elements Qh, Ql, and Qc, first and second liquid crystal capacitors Clch and Clcl, first and second sustaining capacitors Csth and Cstl, and a voltage drop capacitor Cstd. Herein, the first switching element Qh and a first thin film transistor Qh, the second switching element Ql and a second thin film transistor Ql, and the third switching element Qc and a third thin film transistor Qc are each represented by the same reference numeral.

The first switching element Qh and the second switching element Ql are connected to the gate line 121 and the data line 171, and the third switching element Qc is connected to the voltage drop gate line 123.

The first switching element Qh and the second switching element Ql are 3-terminal elements such as a thin film transistor, etc. provided on the lower display panel 100. Control terminals of the first switching element Qh and the second switching element Ql are connected with the gate line 121, input terminals of the first switching element Qh and the second switching element Ql are connected with the data line 171, and output terminals of the first switching element Qh and the second switching element Ql are connected with the first and second liquid crystal capacitors Clch and Clcl and the first and second sustaining capacitors Csth and Cstl, respectively.

The third switching element Qc is also a 3-terminal element such as a thin film transistor, etc. provided on the lower display panel 100 and a control terminal of the third switching element Qc is connected with the voltage drop gate line 123, an input terminal of the third switching element Qc is connected with the second liquid crystal capacitor Clcl, and an output terminal of the third switching element Qc is connected with the voltage drop capacitor Cstd.

Referring to FIG. 3, a first subpixel electrode 191h connected with the first switching element Qh and the common electrode 270 of the upper display panel 200 (FIG. 5) are overlapped with each other to form the first liquid crystal capacitor Clch. A second subpixel electrode 191l connected with the second switching element Ql and the common electrode 270 of the upper display panel 200 are overlapped with each other to form the second liquid crystal capacitor Clcl. The first and second sustaining capacitors Csth and Cstl are formed by overlapping the sustaining electrode line 125 including the sustaining electrode 129 with the first and second subpixel electrodes 191h and 191l.

The voltage drop capacitor Cstd is connected with the output terminal of the third switching element Qc and the sustaining electrode line 125 and is formed by overlapping the sustaining electrode line 125 and the output terminal of the third switching element Qc that are provided on the lower display panel 100 with each other with an insulator interposed therebetween.

Hereinafter, referring to FIG. 3, FIG. 4, FIG. 5, FIG. 6, FIG. 7 and FIG. 8, the liquid crystal display shown in FIG. 2 will be described in more detail.

The liquid crystal display according to the exemplary embodiment of the present invention includes the lower display panel 100 and the upper display panel 200 that face each other, the liquid crystal layer 3 interposed between the two display panels 100 and 200, and a pair of polarizers (not shown) attached to outer surfaces of the display panels 100 and 200.

First, the lower display panel 100 will be described.

A plurality of gate conductors including a plurality of gate lines 121, a plurality of voltage drop gate lines 123, and a plurality of sustaining electrode lines 125 are formed on an insulating substrate 110.

The gate lines 121 and the voltage drop gate lines 123 primarily extend in a transverse direction and transmit a gate signal. The gate line 121 includes a first gate electrode 124h and a second gate electrode 124l that vertically protrude and the voltage drop gate line 123 includes a third gate electrode 124c that protrudes upward. The first gate electrode 124h and the second gate electrode 124l are connected with each other to form one protrusion.

The sustaining electrode line 125 also extends primarily in the transverse direction and transmits predetermined voltage such as common voltage Vcom, etc. The sustaining electrode line 125 includes a sustaining electrode 135 extending vertically, a pair of vertical portions 128 extending downward substantially in a vertical direction toward the gate line 121, and a transverse portion 127 connecting ends of the pair of vertical portions 128 with each other. The transverse portion 127 includes a capacitive electrode 126 extending downward.

A gate insulating layer 140 is formed on the gate conductors 121, 123, 125.

A plurality of linear semiconductors 151 that may be made of amorphous or crystalline silicon, etc. are formed on the gate insulating layer 140. The linear semiconductor 151 extends primarily in the vertical direction and includes the first and second semiconductors 154h and 154l that extend toward the first and second gate electrodes 124h and 124l and are connected with each other and a third semiconductor 154c connected with the second semiconductor 154l. The third semiconductor 154c extends to form a fourth semiconductor 157.

A plurality of linear ohmic contacts (not shown) are formed on the linear semiconductor 151, a first ohmic contact (not shown) is formed on the first semiconductor 154h, and a second ohmic contact 164b and a third ohmic contact (not shown) are formed evenly on the second semiconductor 154l and the third semiconductor 154c. The linear ohmic contact includes a first protrusion (not shown) disposed on a first protrusion of the semiconductor by forming a pair with a first island-type ohmic contact, a second protrusion (not shown) disposed on a second protrusion of the semiconductor by forming a pair with a second island-type ohmic contact, and a third protrusion (not shown) disposed on a third protrusion of the semiconductor by forming a pair with a third island-type ohmic contact. The third ohmic contact extends to form a fourth ohmic contact 167.

A data conductor including the plurality of data lines 171, a plurality of first drain electrodes 175h, a plurality of second drain electrodes 175l, and a plurality of third drain electrodes 175c is formed on the ohmic contacts 164b and 167.

The data lines 171 transmit data signals and extend primarily in the vertical direction to cross the gate line 121 and the voltage drop gate line 123. Each data line 171 includes a first source electrode 173h and a second source electrode 173l that extend toward the first gate electrode 124h and the second gate electrode 124l to form a 'un' shape together.

Each of the first drain electrode 175h, the second drain electrode 175l, and the third drain electrode 175c includes one wide end and the other bar-type end. The bar-type end of each of the first drain electrode 175h and the second drain electrode 175l is partially surrounded by the first source electrode 173h and the second source electrode 173l. The wide end of the second drain electrode 175l extends again to form the third source electrode 173c bent in a 'U' shape. The wide end 177c of the third drain electrode 175c is overlapped with the capacitive electrode 126 to form the voltage drop capacitor Cstd and the bar-type end is partially surrounded by the third source electrode 173c.

The first, second, and third gate electrodes 124h, 124l, and 124c, the first, second, and third source electrodes 173h, 173l, and 173c, and the first, second, and third drain electrodes 175h, 175l, and 175c form the first, second, and third thin film transistors (TFTs) Qh, Ql, and Qc together with the first, second, and third island-shape semiconductors 154h, 154l, and 154c, respectively. A channel of the thin film transistor is formed in each of the semiconductors 154h, 154l, and 154c between each of the source electrodes 173h, 173l, and 173c, and each of the drain electrodes 175h, 175l, and 175c.

The linear semiconductor 151 including the semiconductors 154h, 154l, and 154c has substantially the same planar shape as the data conductors 171, 175h, 175l, and 175c and the ohmic contacts 164b and 167 below the data conductors except for a channel area between the source electrodes 173h, 173l, and 173c and the drain electrodes 175h, 175l, and 175c. That is, an exposed part without being covered by the data conductors 171, 175h, 175l, and 175c is provided in addition to parts between the source electrodes 173h, 173l, and 173c and the drain electrodes 175h, 175l, and 175c in the linear semiconductor 151 including the semiconductors 154h, 154l, and 154c.

A lower passivation layer 180p that may be made of an inorganic insulating material such as silicon nitride or silicon oxide is formed on the data conductors 171, 175h, 175l, and 175c and the exposed part of the semiconductors 154h, 154l, and 154c.

The first color filter 230A and the second color filter 230B are located on the lower passivation layer 180p. As shown in FIG. 4, each of the color filters 230A and 230B is located in most of the area except for areas at which the first thin film transistor Qh, the second thin film transistor Ql, and the third transistor Qc are located. Parts of the first color filter 230A and the second color filter 230B, which extend in the vertical direction between the adjacent data lines 171 are overlapped with each other. The part where the first color filter 230A and the second color filter 230B are overlapped with each other may be overlapped with at least a part of the data line 171. Each of the color filters 230A and the 230B may display any one of primary colors including three primary colors such as red, green, and blue colors, etc. For each color filter 230A and 230B, the thickness of the overlapped part where the first color filter 230A and the second color filter 230B are overlapped with each other may be less than the thickness of the rest of the color filter part. The width of the part where the first color filter 230A and the second color filter 230B are overlapped with each other is preferably greater than or equal to approximately 7 μm.

The colored member 220 is located on an area where the color filters 230A and 230B are not located and the area where the first color filter 230A and the second color filter 230B are overlapped with each other. The colored member 220 extends vertically on the gate line 121 and the voltage drop gate line 123 and includes a first colored member 220a covering an area where the first thin film transistor Qh, the second thin film transistor Ql, and the third thin film transistor Qc are located and a second colored member 220b extending on the data line 171. The height of a part of the second colored member 220b, which is disposed on the first color filter 230A and the second color filter 230B overlapped with each other is greater than those of the rest of the parts of the colored member 220. This will be described in detail.

Referring to FIG. 6 and FIG. 7, the height of the second colored member 220b disposed on the part between the first color filter 230A and the second color filter 230B, which are not overlapped with each other is less than the height of the second colored member 220b disposed on the first color filter 230A and the second color filter 230B there. That is, the second colored member 220b disposed on the first color filter 230A and the second color filter 230B extending on two adjacent data lines 171 is higher than that of the colored member 220 disposed between the first color filter 230A and the second color filter 230B that are not overlapped with each other.

Since the width of the part where the first color filter 230A and the second color filter 230B are overlapped with each other should be approximately 7 μm or more, the colored member 220 may be stably disposed to have a predetermined height.

The colored member 220 may include a black pigment, etc. and prevents light leakage. The colored member 220 may be referred to as a black matrix.

An upper passivation layer 180q is formed on the color filter 230 and the colored member 220. The upper passivation layer 180q prevents the color filter 230 and the colored member 220 from getting loose and suppresses contamination of the liquid crystal layer 3 due to an organic material such as a solvent introduced from the color filter 230 to prevent a defect such as an afterimage which may be caused in driving a screen.

A plurality of first contact holes 185h and a plurality of second contact holes 185l that expose the wide end of the first drain electrode 175h and the wide end of the second drain electrode 175l, respectively are formed in the lower passivation layer 180p, the colored member 220, and the upper passivation layer 180q.

A plurality of pixel electrodes 191 are formed on the upper passivation layer 180q.

Referring to FIG. 3, the pixel electrodes 191 include a first subpixel electrode 191h and a second subpixel electrode 191l that are separated from each other with two gate lines 121 and 123 interposed therebetween, are disposed at upper and lower portions of a pixel area around the gate lines 121 and 123 and are adjacent to each other in a column direction. Each of the first subpixel electrode 191h and the second subpixel 191l includes a basic electrode 199 shown in FIG. 8 or at least one modification thereof.

The thickness of the overlap between the color filters 230A and 230B is thicker than those of the parts where the color filters 230A and the 230B are overlapped with the pixel electrode 191.

Hereinafter, referring to FIG. 8, the basic electrode 199 will be described in detail.

As shown in FIG. 8, the basic electrode 199 has an overall rectangular shape and includes a cross stem portion constituted by a transverse stem portion 193 and a vertical stem portion 192 orthogonal thereto. Further, the basic electrode 199 is divided into a first subarea Da, a second subarea Db, a third subarea Dc, and a fourth subarea Dd by the transverse stem portion 193 and the vertical stem portion 192 and each of the subareas Da, Db, Dc and Dd includes a plurality of first, second, third and fourth minute branch portions 194a, 194b, 194c, and 194d, respectively.

The first minute branch portion 194a extends obliquely to an upper left direction from the transverse stem portion 193 or the vertical stem portion 192 and the second minute branch portion 194b extends obliquely to an upper right direction from the transverse stem portion 193 or the vertical stem portion 192. Further, the third minute branch portion 194c extends obliquely to a lower left direction from the transverse stem portion 193 or the vertical stem portion 192 and the fourth minute branch portion 194d extends obliquely to a lower right direction from the transverse stem portion 193 or the vertical stem portion 192

The first to fourth minute branch portions 194a, 194b, 194c, and 194d form an angle of approximately 45 degrees or 135 degrees with the gate lines 121a and the 121b or the transverse stem portion 193. Further, the minute branch portions 194a, 194b, 194c, and 194d of the adjacent four subareas Da, Db, Dc, and Dd may be orthogonal to each other.

The widths of the minute branch portions 194a, 194b, 194c, and 194d may be in the range of 2.5 to 5.0 μm and a gap between the adjacent minute branch portions 194a, 194b, 194c, and 194d in one subarea Da, Db, Dc, or Dd may be in the range of 2.5 to 5.0 μm.

According to another embodiment of the present invention, the widths of the minute branch portions 194a, 194b, 194c, and 194d may be wider as the minute branch portions are closer to the transverse stem portion 193 or the vertical stem portion 192. Further, a difference between the widest portion and the narrowest portion in one minute branch portion 194a, 194b, 194c, or 194d may be in the range of 0.2 to 1.5 μm.

The first subpixel electrode 191h and the second subpixel electrode 191l include outer stem portions surrounding outer edges and vertical portions of the outer stem portions extend on the data line 171 to prevent capacitive coupling between the data line 171 and the first subpixel electrode 191h and the second subpixel electrode 191l.

The first subpixel electrode 191h and the second subpixel electrode 191l are applied with receive data voltage from the first drain electrode 175h and the second drain electrode 175l through the first contact hole 185h and the second contact hole 185l, respectively. The first subpixel electrode 191h and the second subpixel electrode 191l applied with the data voltage generate an electric field together with the common electrode of the common electrode display panel 200 so as to determine orientation of liquid crystal molecules of the liquid crystal layer 3 between two electrodes 191 and 270. The luminance of light passing through the liquid crystal layer 3 depends on the orientation of the liquid crystal molecules determined as above.

Sides of the first to fourth minute branch portions 194a, 194b, 194c, and 194d distort the electric field to form horizontal components for determining inclined directions of the liquid crystal molecules 31. The horizontal components of the electric field are substantially horizontal to the sides of the first to fourth minute branch portions 194a, 194b, 194c, and 194d. As a result, as shown in FIG. 8, the liquid crystal molecules 31 are inclined in a direction parallel to longitudinal directions of the minute branch portions 194a, 194b, 194c, and 194d. One pixel electrode 191 includes four subareas Da to Dd in which the longitudinal directions of the minute branch portions 194a, 194b, 194c, and 194d are different from each other. Therefore, the liquid crystal molecules 31 are inclined in four different directions and four domains of which the liquid crystal molecules 31 have different orientation directions are formed on the liquid crystal layer 3. As such, when the liquid crystal molecules are inclined in various directions, a reference viewing angle of the liquid crystal display is increased.

The first subpixel electrode 191h and the common electrode 270 form the first liquid crystal capacitor Clch together with the liquid crystal layer 3 interposed therebetween and the second subpixel electrode 191l and the common electrode 270 form the second liquid crystal capacitor Clcl together with the liquid crystal layer 3 interposed therebetween to maintain applied voltage even after the first thin film transistor Qh and the second thin film transistor Ql are turned off.

The first and second subpixel electrodes 191*h* and 191*l* are overlapped with the sustaining electrode line 125 including the sustaining electrode 129 to form the first and second sustaining capacitors Csth and Cstl and the first and second sustaining capacitors Csth and Cstl strengthens voltage sustaining capacities of the first and second liquid crystal capacitors Clch and Clcl, respectively.

The capacitive electrode 126 and an extension portion 177*c* of the third drain electrode 175*c* are overlapped with each other with the gate insulating layer 140 and the fourth semiconductor layer 157 and the fourth ohmic contact layer 167 interposed therebetween to form the voltage drop capacitor Cstd. In another embodiment of the present invention, the fourth semiconductor layer 157 and the fourth ohmic contact layer 167 may be removed, which are disposed between the capacitive electrode 126 and the extension portion 177*c* of the third drain electrode 175*c* forming the voltage drop capacitor Cstd.

The spacer 325 is formed on the upper passivation layer 180*q*. The spacer 325 maintains a constant cell gap of the liquid crystal layer 3 disposed between the lower display panel 100 and the upper display panel 200. In another embodiment, the spacer 325 may be formed by the same layer as the colored member 220.

Although not shown, the spacer 325 may include a first spacer and a second spacer that have different heights. The heights of the first spacer and the second spacer are greater than that of the colored member 220. The spacer having the greater height between the first spacer and the second spacer serves to maintain the cell gap and the second spacer serves to maintain the cell gap when elasticity of the first spacer is damaged due to external pressure.

The part of the colored member 220 disposed on the first color filter 230A and the second color filter 230B that are overlapped with each other among the above-mentioned colored member 220 parts may have a height less than the spacer 325 and a difference in height between the colored member 220 and the spacer 325 may be approximately 2.0 µm or less and more specifically, may be less than approximately 1.4 µm.

The part of the colored member 220 disposed on the first color filter 230A and the second color filter 230B that are overlapped with each other among the colored member 220 parts may have a height less than the spacer 325, but greater than other thin film structures. Therefore, the colored member 220 may serve as a subspacer that prevents a smear defect from being generated due to a damage of the elasticity of the spacer 325, which is caused by the external pressure by supporting two display panels when a user applies pressure to a local portion at the time of using the liquid crystal display.

Since the colored member 220 disposed on the first color filter 230A and the second color filter 230B that are overlapped with each other among the colored member 220 may have the height smaller than the first spacer and the second spacer, the colored member may serve to support the liquid crystal layer when pressure higher than pressure for the second spacer to sustain is applied to the second spacer and the liquid crystal cell gap becomes thus narrowed.

Likewise, three or more spacers having different heights which maintain the liquid crystal cell gap are formed to thereby stably maintain the liquid crystal cell even under the external pressure.

A lower orientation layer (not shown) is formed on the pixel electrode 191, the exposed upper passivation layer 180*q*, and the spacer 325. The lower orientation layer may be a vertical orientation layer.

Hereinafter, the upper display panel 200 will be described.

The common electrode 270 is formed on the insulating substrate 210. An upper orientation layer (not shown) is formed on the common electrode 270. The upper orientation layer may be the vertical orientation layer.

A polarizer of a pair of polarizers (not shown) is provided on each outer surface of the two display panels 100 and 200. It is preferable that transmission axes of the two polarizers are orthogonal to each other and any one transmission axis of them is parallel to the gate line 121.

The liquid crystal layer 3 has negative permittivity anisotropy and the liquid crystal molecules of the liquid crystal layer 3 are oriented to have long axes vertical to the surfaces of the two display panels 100 and 200 under the condition of no electric field. Accordingly, incident light does not pass through the orthogonal polarizer and is blocked under the condition of no electric field.

As described above, the first subpixel electrode 191*h* and the second subpixel electrode 191*l* applied with the data voltage generate the electric field together with the common electrode 270 of the common electrode display panel 200, such that the liquid crystal molecules of the liquid crystal layer 3 oriented to be vertical to the surfaces of the two electrodes 191 and 270 under the condition of no electric field lie in a direction horizontal to the surfaces of the two electrodes 191 and 270 and the luminance of the light passing through the liquid crystal layer 3 depends on the lying angles of the liquid crystal molecules.

Like this, in the liquid crystal display according to the exemplary embodiment of the present invention, a high step is formed by partially overlapping adjacent two color filters with each other and a colored member is formed on the step, such that the colored member may be used as a light shielding member for preventing light leakage and a subspacer for preventing a smear defect from being generated. Accordingly, it is possible to prevent the smear defect while constantly maintaining a cell gap of the liquid crystal display without an additional process for manufacturing the subspacer and in addition, it is possible to prevent light leakage between pixels.

Figure 9:
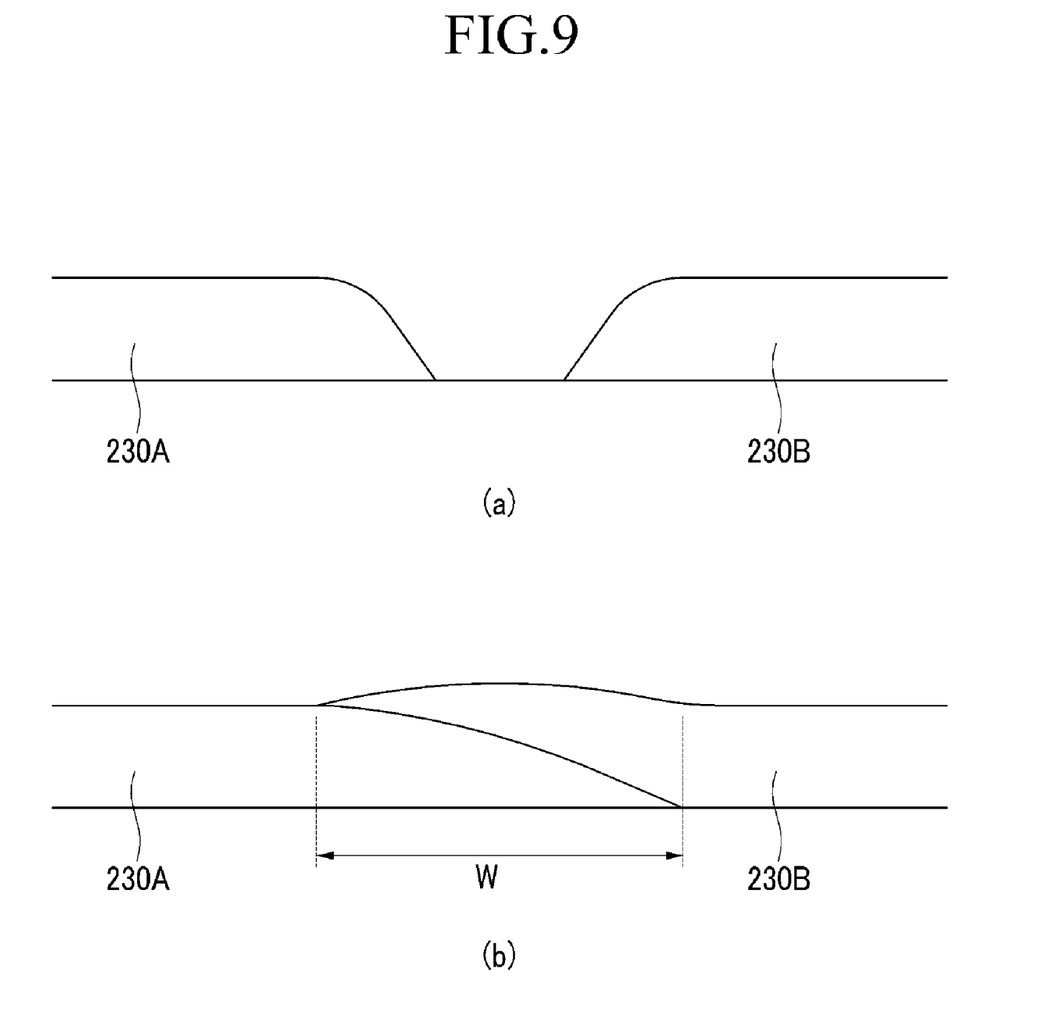
FIG. 9 is a cross-sectional view showing a part of a liquid crystal display according to another embodiment of the present invention.

Hereinafter, a liquid crystal display according to another embodiment of the present invention will be described with reference to FIG. 9. FIG. 9 is a cross-sectional view showing a part of a liquid crystal display according to another embodiment of the present invention. FIG. 9A is a cross-sectional view showing two color filters not overlapped with each other and FIG. 9B is a cross-sectional view showing two color filters overlapped with each other.

In the embodiment, when the color filters are formed, by exposing an edge of an overlap of the color filters with a halftone mask such as a slit mask, etc., the overlap may have an edge more gentle than an edge of portions of the color filters that are not overlapped with each other and the thicknesses of the color filters may be decreased. By this configuration, since a cross section W of the overlap of the color filters is increased and the surfaces of the color filters may be flattened, an area of a region in which a colored member used as a subspacer for preventing a smear defect may be disposed is increased and the colored member may be stably disposed. Accordingly, it is possible to prevent the position of the subspacer from being changed due to an alignment error, etc.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a first substrate;
a first color filter and a second color filter disposed on the first substrate;
a colored member disposed on the first color filter and the second color filter; and
a pixel electrode disposed on the first color filter and the second color filter,
wherein the first color filter and the second color filter are partially overlapped with each other,
wherein the thickness of the first color filter and the thickness of the second color filter at an overlap between the first color filter and the second color filter are less than the thickness of the first color filter and the thickness of the second color filter at an overlap between the respective color filters and the pixel electrode, and
wherein a maximum height on the first substrate of a first portion of the colored member disposed at the overlap between the first color filter and the second color filter is greater than a maximum height on the first substrate of a second portion of the colored member disposed not at the overlap between the first color filter and the second color filter.

2. The liquid crystal display of claim 1, wherein:
the surface of the overlap where the first color filter and the second color filter are overlapped with each other is flat.

3. The liquid crystal display of claim 2, wherein:
the width of the overlap of the first color filter and the second color filter is greater than or equal to approximately 7 µm.

4. The liquid crystal display of claim 3, further comprising:
a spacer for maintaining a cell gap,
wherein the height of the colored member is less than the height of the spacer.

5. The liquid crystal display of claim 4, wherein:
a difference in height between the colored member and the spacer is less than or equal to approximately 2 µm.

6. The liquid crystal display of claim 5, wherein:
the difference in height between the colored member and the spacer is less than or equal to approximately 1.4 µm.

7. The liquid crystal display of claim 4, wherein:
the spacer and the colored member are formed of the same layer.

8. The liquid crystal display of claim 4, wherein:
the spacer comprises a first spacer and a second spacer that have different heights from each other, and
the colored member has a height less than a height of the first spacer and a height of the second spacer.

9. The liquid crystal display of claim 4, further comprising:
a first signal line disposed on the first substrate,
wherein the overlap of the first color filter and the second color filter is partially overlapped with the first signal line.

10. The liquid crystal display of claim 9, wherein:
the first signal line comprises a data line.

11. A liquid crystal display, comprising:
a first substrate;
a first color filter and a second color filter disposed on the first substrate;
a colored member disposed on the first color filter and the second color filter; and
a pixel electrode disposed on the first color filter and the second color filter,
wherein the first color filter and the second color filter are partially overlapped with each other
wherein the thickness of the first color filter and the thickness of the second color filter at an overlap between the first color filter and the second color filter are less than the thickness of the first color filter and the thickness of the second color filter at an overlap between the respective color filters and the pixel electrode,
wherein the height of the colored member disposed at the overlap between the first color filter and the second color filter is greater than the height of the colored member disposed not at the overlap between the first color filter and the second color filter; and
wherein the width of the overlap of the first color filter and the second color filter is greater than or equal to approximately 7 µm.

12. The liquid crystal display of claim 11, further comprising:
a spacer to maintain a cell gap,
wherein the height of the colored member is less than a height of the spacer.

13. The liquid crystal display of claim 12, wherein:
a difference in height between the colored member and the spacer is less than or equal to approximately 2 µm.

14. The liquid crystal display of claim 13, wherein:
the difference in height between the colored member and the spacer is less than or equal to approximately 1.4 µm.

15. The liquid crystal display of claim 12, wherein:
the spacer and the colored member are formed of the same layer.

16. The liquid crystal display of claim 12, wherein:
the spacer comprises a first spacer and a second spacer that have different heights from each other, and
the colored member has a height less than a height of the first spacer and a height of the second spacer.

17. The liquid crystal display of claim 12, further comprising:
a first signal line disposed on the first substrate,
wherein the overlap of the first color filter and the second color filter is partially overlapped with the first signal line.

18. The liquid crystal display of claim 17, wherein:
the first signal line comprises a data line.

19. The liquid crystal display of claim 1, further comprising:
a spacer to maintain a cell gap,
wherein the height of the colored member is less than a height of the spacer.

20. A liquid crystal display, comprising:
a first substrate;
a first color filter and a second color filter disposed on the first substrate;
a colored member disposed on the first color filter and the second color filter;
a pixel electrode disposed on the first color filter and the second color filter; and
a spacer to maintain a cell gap,
wherein the height of the colored member is less than a height of the spacer,
wherein the first color filter and the second color filter are partially overlapped with each other
wherein the thickness of the first color filter and the thickness of the second color filter at an overlap between the first color filter and the second color filter are less than the thickness of the first color filter and the thickness of the second color filter at an overlap between the respective color filters and the pixel electrode,
wherein the height of the colored member disposed at the overlap between the first color filter and the second color filter is greater than the height of the colored member disposed not at the overlap between the first color filter and the second color filter, and wherein a difference in height between the colored member and the spacer is less than or equal to approximately 2 μm.

21. The liquid crystal display of claim 20, wherein:
the difference in height between the colored member and the spacer is less than or equal to approximately 1.4 μm.

22. The liquid crystal display of claim 19, wherein:
the spacer and the colored member are formed of the same layer.

23. The liquid crystal display of claim 19, wherein:
the spacer comprises a first spacer and a second spacer that have different heights from each other, and
the colored member has a height less than a height of the first spacer and a height of the second spacer.

24. The liquid crystal display of claim 19, further comprising:
a first signal line disposed on the first substrate,
wherein the overlap of the first color filter and the second color filter is partially overlapped with the first signal line.

25. The liquid crystal display of claim 24, wherein:
the first signal line comprises a data line.

26. The liquid crystal display of claim 1, further comprising:
a first signal line disposed on the first substrate,
wherein the overlap of the first color filter and the second color filter is partially overlapped with the first signal line.

27. The liquid crystal display of claim 26, wherein:
the first signal line comprises a data line.

* * * * *